(12) United States Patent
Koizumi et al.

(10) Patent No.: US 7,996,437 B2
(45) Date of Patent: Aug. 9, 2011

(54) PROGRAM FOR MAPPING OF DATA SCHEMA

(75) Inventors: Atsuko Koizumi, Sagamihara (JP); Masaru Takeuchi, Kodaira (JP); Toshiko Aizono, Kokubunji (JP); Yasutsugu Morimoto, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 735 days.

(21) Appl. No.: 11/642,828

(22) Filed: Dec. 21, 2006

(65) Prior Publication Data
US 2007/0150495 A1 Jun. 28, 2007

(30) Foreign Application Priority Data
Dec. 27, 2005 (JP) ................................. 2005-374359

(51) Int. Cl.
*G06F 17/30* (2006.01)
(52) U.S. Cl. ...................................................... 707/802
(58) Field of Classification Search .................. 707/805, 707/802, 809
See application file for complete search history.

(56) References Cited

U.S. PATENT DOCUMENTS
| 5,510,978 | A | * | 4/1996 | Colgan | 705/12 |
| 5,586,326 | A | * | 12/1996 | Ryu et al. | 717/104 |
| 2005/0060324 | A1 | * | 3/2005 | Johnson et al. | 707/100 |

FOREIGN PATENT DOCUMENTS
| JP | 08-249338 | 3/1995 |
| JP | 2003-345821 | 5/2002 |
| JP | 2005-157823 | 11/2003 |

* cited by examiner

*Primary Examiner* — Charles Kim
*Assistant Examiner* — Fatima P Mina
(74) *Attorney, Agent, or Firm* — Stites & Harbison PLLC; Juan Carlos A. Marquez, Esq.

(57) ABSTRACT

A data item name constituting a source data schema is extracted (1051), a data item name constituting a target data schema is extracted (1052), element concepts included in the extracted data item names of the source data schema and the target data schema are extracted (1053), a distinctive relation between the data item names is set based on the extracted element concepts to be stored in an ontology (1061), the data item names of the source data schema and the target data schema are read, a correlation is set between the two read data item names based on the distinctive relation to be stored in a mapping definition file (1071).

4 Claims, 15 Drawing Sheets

DESCRIPTION EXAMPLE OF SOURCE DATA SCHEMA            10411

```
<element name= " ORDER DATE " type= " data " >
</element>
<element name= " TRANSACTION NUMBER " type= " data " >
</element>
```

FIG. 2A

DESCRIPTION EXAMPLE OF SOURCE INSTANCE DOCUMENT            10421

< ORDER DATE >20050923</ ORDER DATE >

< TRANSACTION NUMBER >00020033</ TRANSACTION NUMBER >

FIG. 2B

DESCRIPTION EXAMPLE OF TARGET DATA SCHEMA
DEFINITION DOCUMENT            10431

```
<element name= " YEAR, MONTH, AND DAY OF ORDER " type="date">
</element>
<element name= " ORDER NUMBER "    type="integer">
</element>
```

FIG. 2C

DESCRIPTION EXAMPLE OF TARGET DATA INSTANCE DOCUMENT            10441

<YEAR, MONTH, AND DAY OF ORDER > 20040512</YEAR, MONTH, AND DAY OF ORDER >
< ORDER NUMBER > 00010123 < /ORDER NUMBER >

FIG. 2D

DATA STRUCTURE OF SOURCE DATA SCHEMA DATA ITEM INFORMATION STORAGE UNIT

| DATA ITEM NAME | DATA SCHEMA NAME | MASTER ITEM NAME | DATA ATTRIBUTE | INSTANCE LIST |
|---|---|---|---|---|
| 10511 | 10512 | 10513 | 10514 | 10515 |
| TRANSACTION NUMBER | SCHEMA a | TRANSACTION INFORMATION | INTEGER | 00020033, 00020039, 00010001 |
|  |  |  |  |  |
|  |  |  |  |  |

FIG. 3A

DATA STRUCTURE OF TARGET DATA SCHEMA DATA ITEM INFORMATION STORAGE UNIT

| DATA ITEM NAME | DATA SCHEMA NAME | MASTER ITEM NAME | DATA ATTRIBUTE | INSTANCE LIST |
|---|---|---|---|---|
| 10521 | 10522 | 10523 | 10524 | 10525 |
| ORDER NUMBER | SCHEMA 1 | ORDER INFORMATION | INTEGER | 00010123, 00020001, 00030012 |
|  |  |  |  |  |
|  |  |  |  |  |

FIG. 3B

DATA STRUCTURE OF CONCEPT INFORMATION STORAGE UNIT

| CONCEPT NAME 10531 | POSITION IN DATA ITEM NAME 10532 | NUMBER OF DIFFERENT DATA ITEM NAMES 10533 | LIST OF DATA ITEM NAMES 10534 |
|---|---|---|---|
| REQUEST | HEAD | 4 | REQUEST NUMBER, YEAR, MONTH, AND DAY OF REQUEST , · · · |
| ORDER | HEAD | 7 | ORDER NUMBER, YEAR, MONTH, AND DAY OF ORDER , · · · |
| NUMBER | END | 32 | REQUEST NUMBER, ORDER NUMBER , · · · |
| YEAR, MONTH, AND DAY | END | 27 | YEAR, MONTH, AND DAY OF REQUEST, YEAR, MONTH, AND DAY OF ORDER , · · · |
| REQUEST NUMBER | ALL | 1 | REQUEST NUMBER |
|  |  |  |  |
|  |  |  |  |

*FIG. 4*

DATA STRUCTURE OF ONTOLOGY

| CONCEPT NAME | CONCEPT NAME | CONCEPT RELATION | POSITION IN DATA ITEM NAME | EXAMPLE | CHECKING FLAG |
|---|---|---|---|---|---|
| YEAR, MONTH, AND DAY | NUMBER | DISTINCTIVENESS | END | REQUEST, ORDER , ・・・ | 1 |
| ESTIMATE | SHIPPING | AHEAD | HEAD | YEAR, MONTH, AND DAY | 1 |
| ESTIMATE | ARRIVAL | AHEAD | HEAD | YEAR, MONTH, AND DAY | 1 |
| SHIPPING | ARRIVAL | AHEAD | HEAD | YEAR, MONTH, AND DAY | 1 |
| SHIPPING | DELIVERY | AHEAD | HEAD | SCHEDULED DATE | 1 |
| DELIVERY | ARRIVAL | SYNONYMOUS | HEAD | SCHEDULED DATE | 1 |
| DATE | YEAR, MONTH, AND DAY | SYNONYMOUS | END | ORDER | 1 |
| DATE | YEAR, MONTH, AND DAY | SYNONYMOUS | END | ORDER | 1 |

DATA STRUCTURE OF DATA SCHEMA MAPPING DEFINITION STORAGE UNIT

| POINTER TO SOURCE DATA SCHEMA DATA ITEM INFORMATION STORAGE UNIT 107111 | POINTER TO TARGET DATA SCHEMA DATA ITEM INFORMATION STORAGE UNIT 10712 |
|---|---|
| 1 | 3 |
| 2 | 7 |
|  |  |
|  |  |

FIG. 12

COMPANY B'S PRODUCT CLASSIFICATION
(HIERARCHY: SUPERORDINATE CONCEPT ← SUBORDINATE CONCEPT)

COMPANY B'S ONTOLOGY (DISTINCTIVENESS: CONCEPT ← → CONCEPT)

PROGRAM FOR MAPPING OF DATA SCHEMA

CLAIM OF PRIORITY

The present application claims priority from Japanese application P2005-374359 filed on Dec. 27, 2005, the content of which is hereby incorporated by reference into this application.

BACKGROUND OF THE INVENTION

This invention relates to a technology of correlating data item names among a plurality of data schemas.

A recent rise in business-to-business (BtoB) services based on the Internet has led to progresses in international standardization and industry standardization to enhance interoperability of information/services among companies. For example, an industry standard XML/EDI of electronic business XML (ebXML) specifications has become mainstream for electronic data interchange (EDI), an extensible business reporting language (XBRL) has become mainstream for financial information, and thus it is necessary to correlate data items described according to each company's own specifications with items of standard specifications. For correlation tools, there are some tools for interconversion between various original format files and EDI standard format files. However, for all the tools, a correlation of data items among formats of a plurality of databases must be defined manually by using a GUI. This leads to a problem that it takes time and labor to deal with changes such as new introduction of a database system or an information retrieval system, or upgrade to an industry standard, and bedsides, know-how of mapping item names tends to be accumulated merely at an individual level.

As a conventional art regarding the correlation of the data item names, there has been known a method of using a dictionary or an ontology (containing relations among terms used for specification description) that are prepared beforehand. For example, JP 08-249338 A discloses a method of breaking down a data item name into "adjunct+headword+division word" by using a dictionary, and calculating a similarity of data item names based on whether or not each element is found in the dictionary.

JP 2003-345821 A discloses as the information retrieval system a method of describing hierarchical relations or synonymous relations among concepts in an ontology, and generating proximate retrieval conditions by using the ontology.

JP 2005-157823 A discloses a technology of fetching an electronic document and outputting data indicating a conceptual relation between two morphemes.

SUMMARY OF THE INVENTION

However, the conventional art makes it necessary to describe a hierarchical relation or a synonymous relation between concepts in the dictionary or the ontology beforehand to correlate the data item names with each other. In the correlation of the data item names, since corresponding items must be selected from the data item names containing similar constituents, the conventional method of calculating a "similarity" cannot narrow down candidates. For example, in the case of executing correlation to judge which of data item names in another data schema a data item name of "order date" in a certain data schema corresponds to, narrowing-down is difficult only by similarity although candidates of "year, month, and day of order" and "order number" are obtained.

This invention has been made in view of the aforementioned problems, and it is an object of the invention to extract terms that are related to each other but must be distinguished from each other when item names are correlated with each other between different data schemas, and constructing a meaningful and distinctive relation to narrow down correlation candidates of data item names with high accuracy.

According to an aspect of this invention, there is provided a program, which refers to a first data schema and a second data schema that describe data structures to correlate a data item name constituting the first data schema with a data item name constituting the second data schema, in which: the data item name constituting the first data schema is extracted; the data item name constituting the second data schema is extracted; element concepts included in the extracted data item names of the first data schema and the second data schema are extracted; a distinctive relation between the data item names is set based on the extracted element concepts; the data item names of the first data schema and the second data schema are read, and a correlation between the two read data item names is set based on the distinctive relation; and the correlation of the data item names is accumulated.

Further, in the extraction of the element concepts, two data item names of one of the first data schema and the second data schema are read, a set of common character strings is extracted from among character strings constituting the two data item names as a first element concept when character strings of the two data item names are compared with each other and are judged to include synonymous character strings, and a set of character strings excluding common character strings is extracted from the character strings constituting the two data item names as a second element concept when the character strings of the two data item names are compared with each other and are judged to include synonymous character strings.

Thus, according to this invention, it is possible to narrow down correlation candidates of data item names by using a distinctive relation and a time order relation between concepts of terms constituting the data item names. For example, based on knowledge that ""number" and "date" are distinctive concepts (concepts to be distinguished from each other)", it is possible to judge that "order number" and "order date" among data item name candidates corresponding to "order date" are eliminated from candidates because they are distinctive concepts. In other words, it is possible to narrow down data item names with high accuracy by using an additional distinctive relation between concepts to be treated as items different in meaning when a compound word is formed.

Furthermore, it is possible to select correlated candidates from data item names with high accuracy by using the time order relation of the item names.

BRIEF DESCRIPTION OF THE DRAWINGS

FIGS. 2A to 2D are explanatory diagrams of description examples of schema documents, where FIG. 2A shows a source data schema definition document, FIG. 2B shows a source instance document, FIG. 2C shows a target data schema definition document, and FIG. 2D shows a target instance document.

FIGS. 3A and 3B are explanatory diagrams of data structures of a source data schema data item information storage unit and a target data schema data item information storage unit, where FIG. 3A shows the source data schema data item information storage unit, and FIG. 3B shows the target data schema data item information storage unit.

FIG. 4 is an explanatory diagram of a data structure of a concept information storage unit.

FIG. 5 is an explanatory diagram of a data structure of an ontology.

FIG. 12 is an explanatory diagram of a data structure of a data schema mapping definition storage unit.

FIG. 14A shows a hierarchical relation of words in company A, and FIG. 14B shows a distinctive relation of words in company A.

FIG. 15A shows a hierarchical relation of words in company B, and FIG. 15B shows a distinctive relation of words in company B.

DETAILED DESCRIPTION OF THE PREFERRED EMBODIMENTS

Preferred embodiments of this invention will be described below referring to the accompanying drawings.

First Embodiment

A first embodiment will be described by way of example of a data schema mapping assisting system which includes a function of extracting a distinctive relation (concepts to be distinguished from each other, and set in a relation not to be synonymous or similar) and a time order relation between concepts from data schema definitions and instance documents of two databases to store them in an ontology, and a function of narrowing down correlations between data item names by using the ontology so that a target database item name can be correlated with a source database item name.

Figure 1:
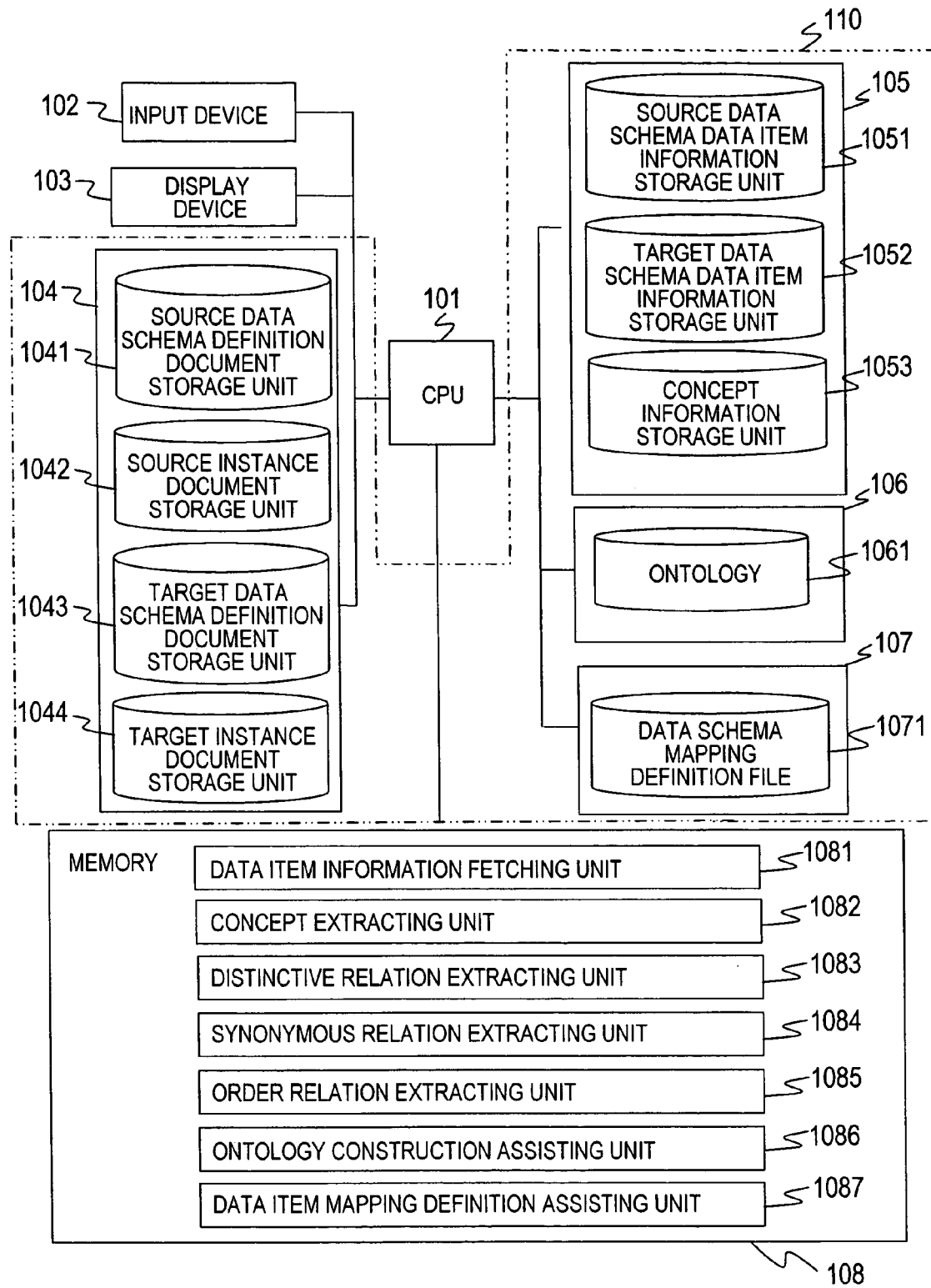
FIG. 1 is a block diagram showing a configuration of a data schema mapping definition assisting system according to an embodiment of this invention.

FIG. 1 is a block diagram of a computer system which assists creation of "data schema mapping definition file" indicating a correlation of data items between different data schemas for data association in a company or between companies.

The computer system includes a CPU 101 for executing an arithmetic operation, an input device 102 constituted of a keyboard, a mouse, and the like, a display unit 103 for displaying an arithmetic operation result or the like, a storage system 110 for storing data or programs, and a memory 108 for temporarily storing data (table or the like).

The storage system 110 includes an input data storage unit 104 for storing input data, an ontology construction data storage unit 105 described below, an ontology storage unit 106 for storing an ontology defining a relation of terms used for describing specifications, and a data schema mapping definition file storage unit 107 for storing a generated data schema mapping definition.

The input data storage unit 104 includes a source data schema definition document storage unit 1041, a source instance document storage unit 1042, a target data schema definition document storage unit 1043, and a target instance document storage unit 1044.

The source data schema definition document storage unit 1041 stores a document defining a schema of a database which becomes a source. The source instance document storage unit 1042 stores real data of a database which becomes a reference.

The target data schema definition document storage unit 1043 stores a document defining a schema of a target database to correlate an item name with a source database. The target instance document storage unit 1044 stores real data of the target database.

FIGS. 2A to 2D show description examples of documents stored in the source data schema definition document storage unit 1041, the source instance document storage unit 1042, the target data schema definition document storage unit 1043, and the target instance document storage unit 1044 of the input data storage unit 104, respectively. Those documents are described in XML/EDI of the electronic business XML (ebXML) specifications, the extensible business reporting language (XBRL) in the case of financial information, or the like.

FIG. 2A shows an example of the source data schema definition document 10411 in which "order date" is defined as a data item name (element name) by a date data type, and "order number" is defined as a data item name by an integer data type.

FIG. 2B shows an example of the source data instance document 10421 in which "20050923" is stored as data of "order date", and "00020033" is stored as data of "transaction number".

FIG. 2C shows an example of the target data schema definition document 10431 in which "year, month, and day of order" is defined as a data item name (element name) by a date data type, and "order number" is defined as a data item name by an integer data type.

FIG. 2D shows an example of the target data instance document 10441 in which "20040512" is stored as data of "year, month, and day of order", and "00010123" is stored as data of "order number".

The ontology construction data storage unit 105 includes a source data schema data item information storage unit 1051, a target data schema data item information storage unit 1052, and a concept information storage unit 1053. The ontology storage unit 106 stores an ontology 1061.

FIGS. 3A and 3B show data structures of the source data schema data item relation storage unit 1051 and the target data schema data item relation storage unit 1052, respectively.

The source data schema data item information storage unit 1051 of FIG. 3A stores data extracted from the source data schema definition document 10411 and the source data schema data instance document 10421 shown in FIGS. 2A and 2B, respectively, as described below. The source data schema data item information storage unit 1051 includes a data item name 10511 for storing an item name of the source data schema definition document, a schema name 10512 given to the source data schema definition document, a master item name 10513 for storing a data item name which becomes a master (superordinate concept) of the data item name 10511, a data attribute 10514 for storing a data type defined in the data item name 10511, and an instance list 10515 for storing instances corresponding to the data item name 10511 in frequency order in one entry.

The target data schema data item information storage unit 1052 of FIG. 3B stores data extracted from the target data schema definition document 10431 and the target data schema data instance document 10441 shown in FIGS. 2C and 2D, respectively, as described below. The target data schema data item information storage unit 1052 includes a data item name 10521 for storing an item name of the target data schema definition document, a schema name 10522 given to the target data schema definition document, a master item name 10523 for storing a data item name which becomes a master (superordinate concept) of the data item name 10521, a data attribute 10524 for storing a data type defined in the data item name 10521, and an instance list 10525 for storing instances corresponding to the data item name 10521 in one entry.

The concept information storage unit 1053 stores concepts constituting item names of the source data schema definition document storage unit 1041 and the target data schema definition document storage unit 1043 as described below. A concept relation between item names is stored in the ontology 1061 as descried below.

The data schema mapping definition file storage unit 107 stores a result of correlation of data item names between the source data schema definition document and the target data schema definition document in the data schema mapping definition file 1071.

In the memory 108, as programs for correlating the data item names by using the ontology 1061 describing a distinctive relation and a time order relation between concepts of terms, data item name information fetching means 1081, concept extracting means 1082, distinctive relation extracting means 1083, synonymous relation extracting means 1084, order relation extracting means 1085, ontology construction assisting means 1086, and data item mapping definition assisting means 1087 are loaded to be executed by the CPU 101.

(Fetching of Data Item Information)

Operations of the programs loaded in the memory 108 to execute ontology construction assistance and data mapping (narrowing-down of correlations of data item names) will be described below.

First, the data item information fetching means 1081 reads a data schema definition document from the source data schema definition document storage unit 1041 of the input data storage unit 104 to fetch data item information in the source data schema data item relation storage unit 1051, and reads a data schema definition document from the target data schema definition document storage unit 1043 to fetch data item information in the target data schema data item relation storage unit 1052.

Figure 6:
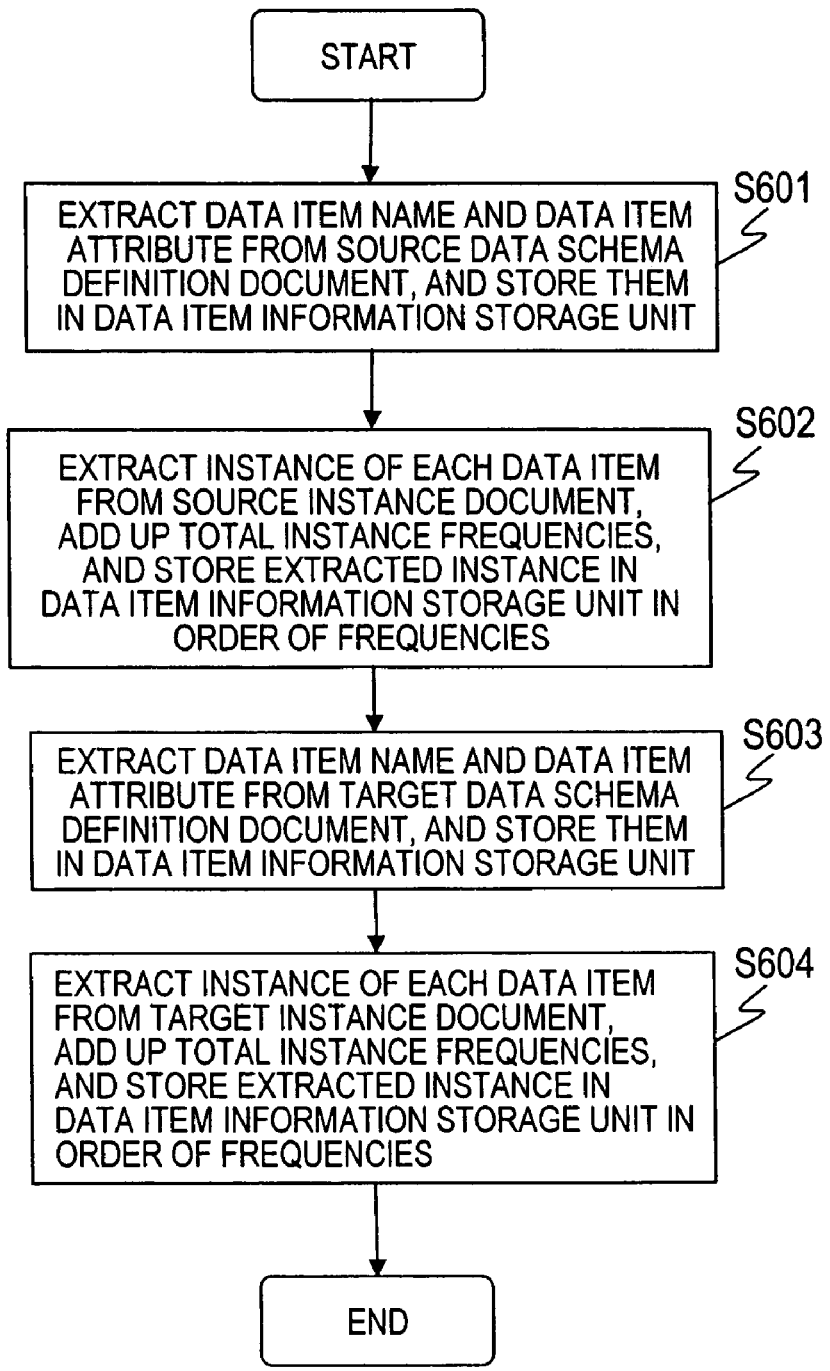
FIG. 6 is a flowchart showing an example of data item information fetching processing.

A processing procedure of this data item information fetching means 1081 will be described referring to a flowchart of FIG. 6.

The data item information fetching means 1081 fetches data item information from the source data schema definition document storage unit 1041 to store the same in the data item name 10511, the data schema name 10512, the master item name 10513, and the data attribute 10514 of the source data schema data item information storage unit 1051 (S601).

The data item information fetching means 1081 extracts instances of data items from the source instance document storage unit 1042 to add up total instance frequencies, and stores the extracted instances in the instance list 10515 of the source data schema data item information storage unit 1051 in order of frequencies (S602).

Similarly, the data item information fetching means 1081 fetches data item information from the target data schema definition document storage unit 1043 to store the same in the data item name 10521, the data schema name 10522, the master item name 10523, and the data attribute 10524 of the target data schema data item information storage unit 1052 (S603). The data item information fetching means 1081 extracts instances of data items from the target instance document storage unit 1044 to add up total instance frequencies, and stores the instances in the extracted instance list 10525 of the target data schema data item information storage unit 1052 in order of frequencies (S604).

Through the aforementioned processing, the item names of the data schema definition document of the database which becomes a reference and is stored in the source data schema definition document storage unit 1041 (simply referred to as source data schema hereinafter), and the data schema definition document of the database stored in the target data schema definition document storage unit 1043 to be interconverted with the source data schema (simply referred to as target data schema hereinafter), and the instances of frequency order are respectively stored in the source data schema data item information storage unit 1051 and the target data schema item information storage unit 1052.

(Extraction of Element Concept and Concept Relation)

Processing of extracting concept information of item names of the two data schemas (source and target data schemas) to be interconverted is executed by the concept extracting means 1082. The concept extracting means 1082 is executed after the item names and the instances of frequency order are stored in the source data schema data item information storage unit 1051 and the target data schema item information storage unit 1052 by the processing of FIG. 6.

The concept extracting means 1082 extracts a concept constituting the data item names of the source and target data schemas to store the same in the concept information storage unit 1053. A data structure of the concept information storage unit 1053 is shown in FIG. 4.

The concept information storage unit 1053 includes a concept name 10531 indicating a concept included in the data item name, a position 10532 in the data item name in which the concept name is present, the number 10533 of data item names of different names among data item names correlated with the concept name 10531, and a data item name list 10534 for storing a list of the data item names correlated with the concept name 10531 in one entry.

A processing procedure of the concept extracting means 1082 will be described referring to a flowchart of FIG. 7.

The concept extracting means 1082 extracts two data item names 10511 from the source data schema data item information storage unit 1051 to compare character strings of the data item names 10511 with each other (S701 to S704).

If a result of the comparison of S704 shows that the two data item names 10511 are different from each other, when the two item names are respectively represented by A and B, element concepts constituting the item names A and B are cut out as follows (S705).

(1) Concept 1=common character string from heads of the item names A and B (2) Concept 2=common character string from ends of the item names A and B (3) Concept 3=character string obtaining by eliminating the common character string from the item name A (4) Concept 4=character string obtained by eliminating the common character string from the item name B Next, information regarding how the concepts 1 to 4 are used in the data item names A and B is registered in the concept information storage unit 1053 (S706). For example, when the data item name A is "request number", and the data item name B is "request year, month, and day", the concepts 1 to 4 become as follows.
(1) Concept 1="request"
(2) Concept 2=nil (none)
(3) Concept 3="number"
(4) Concept 4="year, month, and day"

Thus, the concept names of the concepts 1, 3, and 4, and the information regarding how they are used in the data item names are stored in a concept name 10531, a position 10532 in the data item name, the number 10533 of different data item names, and a data item name list 10534 of the concept information storage unit 1053.

Finally, a concept relation between the concepts 3 and 4 (i.e., difference between the data item names A and B) is extracted to be registered in the ontology 1061 (S707). This processing is carried out for all the combinations of the data item names 10511 (S708 to S711).

Figure 7:
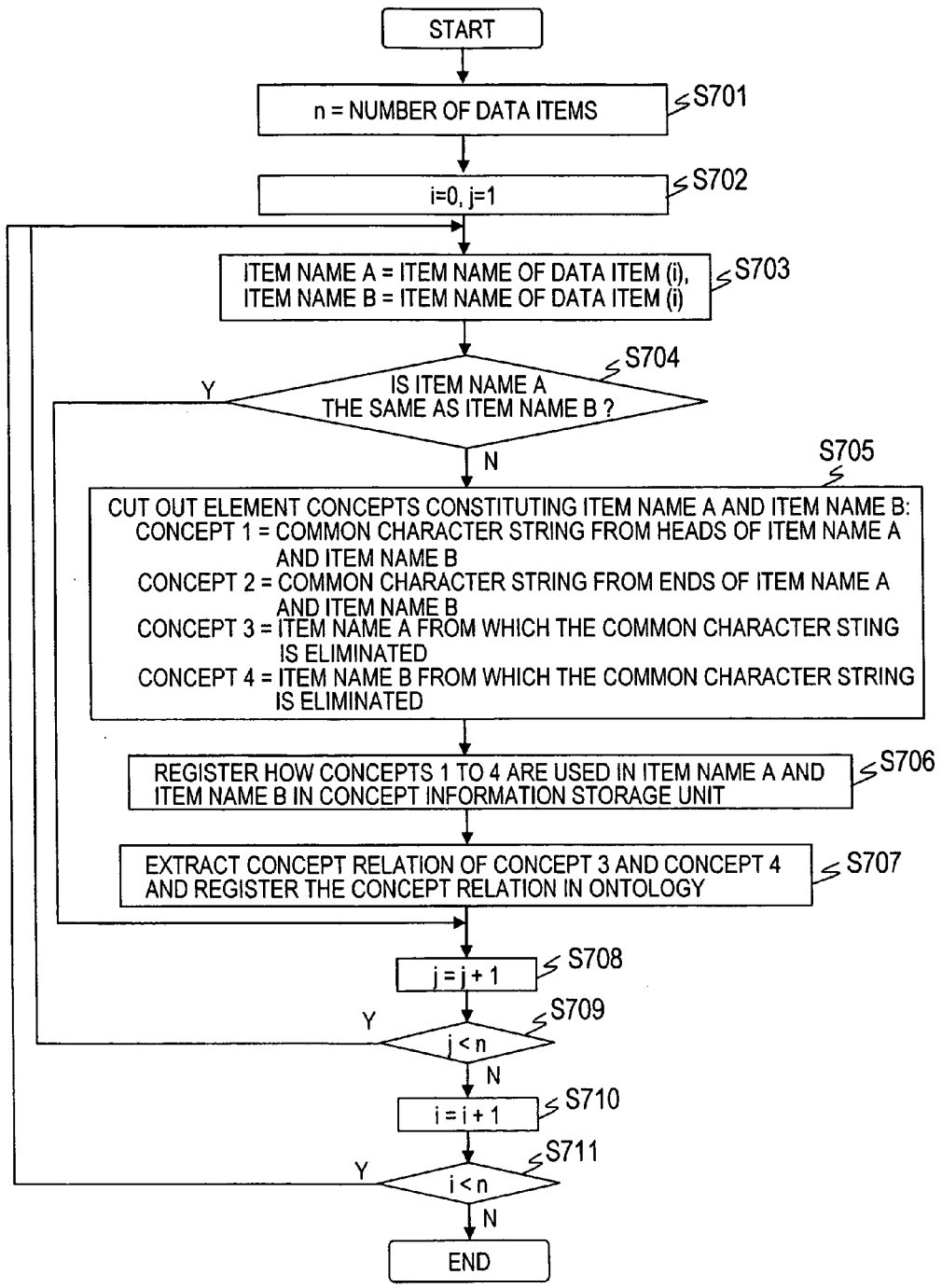
FIG. 7 is a flowchart showing an example of concept extraction processing.

The concept extracting means 1082 executes the processing of FIG. 7 for the target data schema data item information storage unit 1052.

Through the aforementioned processing, the element concepts constituting the data item names of the source and target data schemas are extracted to be stored in the concept information storage unit 1053. Additionally, the differences between the data item names A and B of the source and target data schemas are stored in the ontology 1061.

The element concepts include a first element concept in which the item names A and B include the common character string, and a second element concept constituted of a difference obtained by eliminating the common character string from the item names A and B.

(Details of Concept Relation Extracting Procedure)

In the concept relation extraction step (S707) of FIG. 7, a relation between the concepts 3 and 4 (difference between the data item names A and B) is extracted by the distinctive relation extracting means 1083 and the order relation extracting means 1085 to be stored in the ontology 1061. A data structure of the ontology 1061 is shown in FIG. 5.

In FIG. 5, the ontology 1061 includes a concept name 10541 for storing the concept 3 (character string obtained by eliminating the common character string from the item name A), a concept name 10542 for storing the concept 4 (character string obtained by eliminating the common character string from the item name B), a concept relation 10543 for storing a concept relation between two concept names 10541 and 10542, positions 10544 of the concept names 10541 and 10542 in the data item name A or B, an example 10545 for storing a list of the extracted item names A and B, and a checking flag 10546 indicting that an operator or a manager has checked a relevant entry in one entry.

Figure 8:
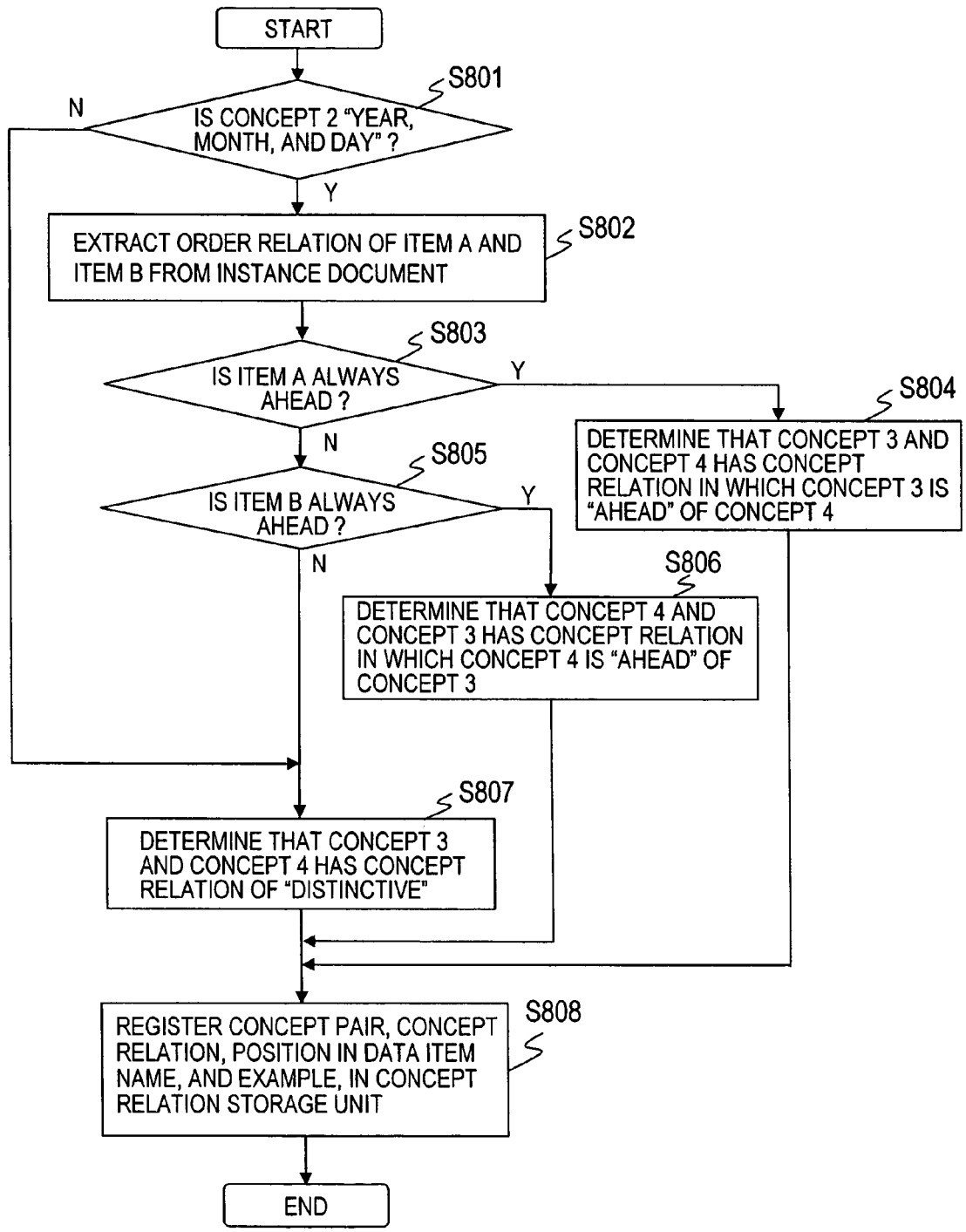
FIG. 8 is a flowchart showing an example of concept relation extraction processing.

Next, processing procedures of the concept relation extracting means 1085 and the distinctive relation extracting means 1083 will be described referring to a flowchart of FIG. 8.

(1) Extraction of order relation

When the superordinate concept 2 (common character string from the ends of the data item names A and B) is "year, month, and day" (S801), a time order relation between the concepts 3 and 4 (difference between the data item names A and B) is extracted. First, a time-sequential order relation between the data item names A and B is extracted from the instance document storage units 1042 or 1044 (S802).

If the data item name A is always ahead in order (S803), it is judged that the concept 3 is ahead of the concept 4 in order (S804). For example, if "year, month, and day of estimation" is always ahead of "year, month, and day of shipping", it is judged that the order of "estimate" is "ahead" of "shipping". Conversely, if the data item name B is always ahead in order (S805), it is judged that the order of the concept 4 is "ahead" of the concept 3 (S806).

The order relation extracting means 1085 targets data item names indicating time-axial positions. Accordingly, as conditions of a character string of a data item end, "date", "year and month", "month/year/time", and the like are conceivable in addition to "year, month, and day".

For example, when there are "estimate number", "shipping number", and "arrival number" as mapping destination candidates of "delivery number", it is presumed that the following pieces of information are obtained for a time order relation.
(1) Order relation of "estimate, shipping, and arrival"
(2) Order relation of "shipping, and delivery"

According to this example, by using information that "delivery" is after "shipping", it is possible to eliminate "estimate" and "shipping" from synonymous word candidates of "delivery". Thus, the mapping destination candidates of "delivery number" can be narrowed down to "arrival number" by eliminating "estimate number" and "shipping number".

Processing similar to the aforementioned may be executed under a condition that the data attributes 10514 and 10524 of the data item names are "time" or "year, month, and day".

(2) Extraction of distinctive relation

When there is no order relation between the concepts 3 and 4 (difference between the item names A and B), the distinctive relation extracting means 1083 judges that the concepts 3 and 4 are in distinctive relation to each other (S807). For example, when the data item name A is "request number" and the data item name B is "request year, month, and day", the concepts 3 and 4 respectively become "number" and "year, month, and day", and those concepts are judged to be in "distinctive relation". When the concept 2 is not "year, month, and day" in the step S801, the process proceeds to the step S807 to set a distinctive relation.

The "distinctive relation" indicates a relation of terms which never become synonyms, especially a relation in which items are treated as different in the case of item names of the database, or a concept relation in which items are treated as different in meaning in the case of compound words.

The pieces of information regarding the order relation and the distinctive relation between the concepts extracted through the aforementioned procedures are stored in concept names 10541 and 10542, a concept relation 10543, a position 10544 in the data item name, and an example 10545 of the ontology 1061 (S808).

(Data Item Mapping Definition Assistance)

The data item mapping definition assisting means 1087 assists correlation of data item names between the source and target data schemas by using the distinctive relation and the order relation between the concepts stored in the ontology 1061. A result of the correlation is stored in a data schema mapping definition file 1071 shown in FIG. 12.

In FIG. 12, the data schema mapping definition file 1071 includes a pair of a source pointer 107111 for storing a pointer indicating a position of the data item name in the source data schema item information storage unit 1051, and a target pointer 107112 for storing a pointer indicating a position of the data item name in the target data schema item information storage unit 1052.

Figure 9:
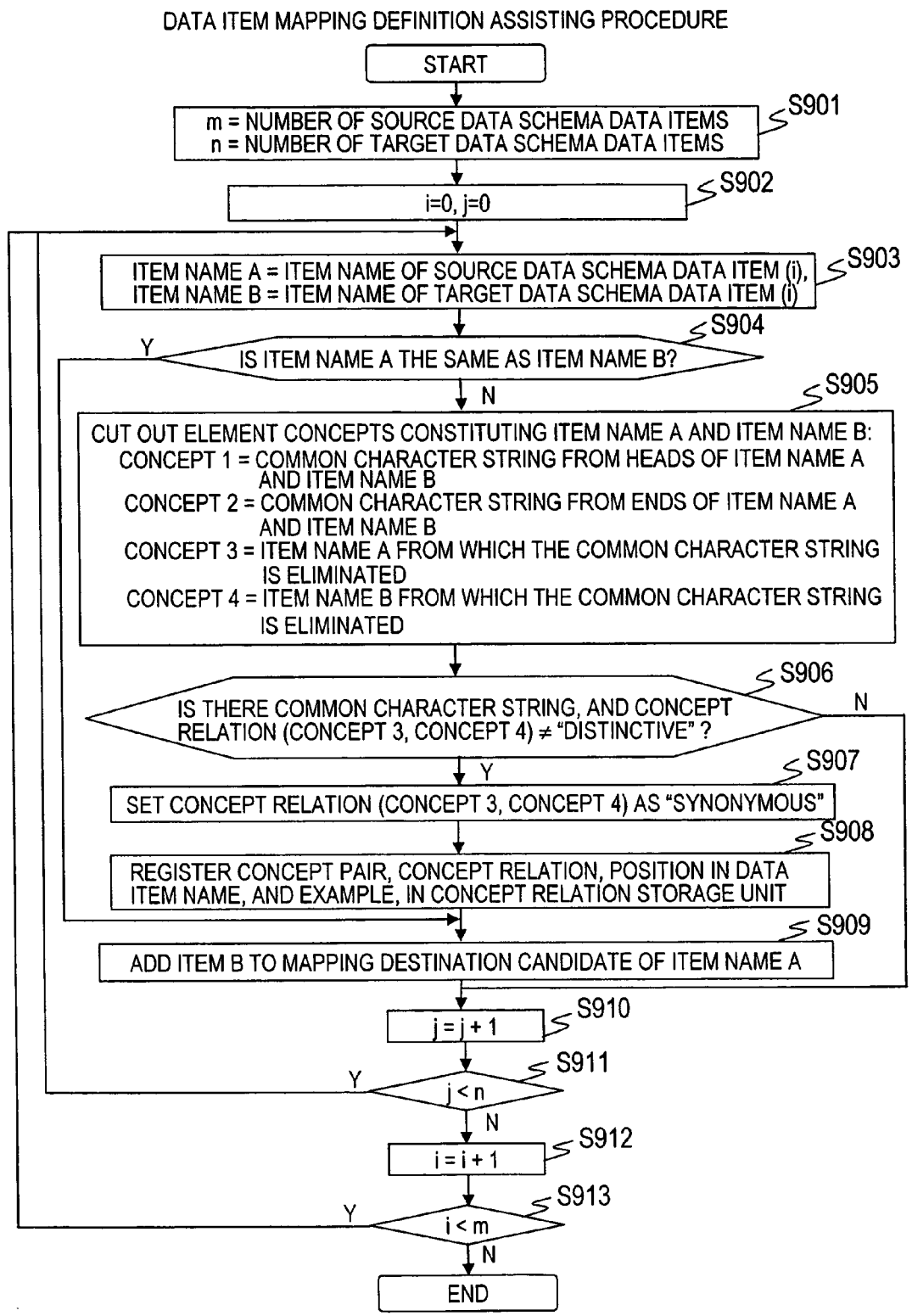
FIG. 9 is a flowchart showing an example of data item mapping definition assisting processing.

Processing of the data item mapping definition assisting means 1087 for constructing the data schema mapping definition file 1071 will be described below referring to a flowchart of FIG. 9.

As a method of correlating the data item names between the two data schemas, i.e., the source and target data schemas, data items including a common character string such as "order date" or "year, month, and day of order" may be extracted as candidates.

Accordingly, the data item mapping definition assisting means 1087 extracts data items one by one from the source data schema data item information storage unit 1051 and the target data schema item information storage unit 1052 to compare character strings of the data item names 10511 and 10521 with each other (S901 to S904). When the data item name 10511 of the source data schema is represented by a data item name A, and the data item name 10521 of the target data schema is represented by a data item name B, element concepts constituting the data item names A and B are cut out as follows (S905).

(1) Concept 1=common character string from heads of the item names A and B (2) Concept 2=common character string from ends of the item names A and B (3) Concept 3=character string obtaining by eliminating the common character string from the item name A (4) Concept 4=character string obtained by eliminating the common character string from the item name B A feature of this system is that correlation candidates are narrowed down by using the pieces of information regarding the distinctive relation and the time order relation between the concepts constituting the data item names A and B. In other words, when there is a common character string between the data item names A and B, by referring to the ontology 1061, the concepts 3 and 4 are set as synonymous word candidates (S907) under a condition that the concepts 3 and 4 (difference between the item names A and B) are not in "distinctive relation" (S906). Then, a synonymous relation between the concepts is stored in concept names 10611 and 10612, a concept relation 10613, a position 10614 in the data item name, and an example 10615 of the ontology 1061 (S908). The processing of the step S908 correspond to that of the synonymous relation extracting means 1084 of FIG. 1.

Next, the data item mapping definition assisting means 1087 adds the data item name B to the mapping destination candidate of the date item name A of the data schema mapping definition file 1071 (S909). This processing is carried out for all the combinations of the data item names (S910 to S913).

Similarly, the data item mapping definition assisting means 1087 narrows down mapping destination candidates by using the information of the time order relation between the concepts 3 and 4 (difference between the item names A and B). For example, when there are "estimate number", "shipping number", and "arrival number" as mapping destination candidates of "delivery number", as shown in FIG. 5, it is presumed that pieces of following information is obtained from the ontology 1061.

(1) Order relation that "shipping" is ahead of "delivery"

(2) Order relation that "estimate" is ahead of "shipping"

In this case, "estimate" and "shipping" can be eliminated from synonymous word candidates of "delivery". Accordingly, "estimate number" and "shipping number" can be eliminated from the mapping destination candidates of "shipping number".

Thus, the data item mapping definition assisting means 1087 of this system narrows down the mapping destination candidates regarding the item names of the two databases (data schemas) through the aforementioned procedure to display the mapping destination candidates on a screen of the display unit 103. A display example of the data item mapping definition assisting screen is shown in FIG. 10.

Figure 10:
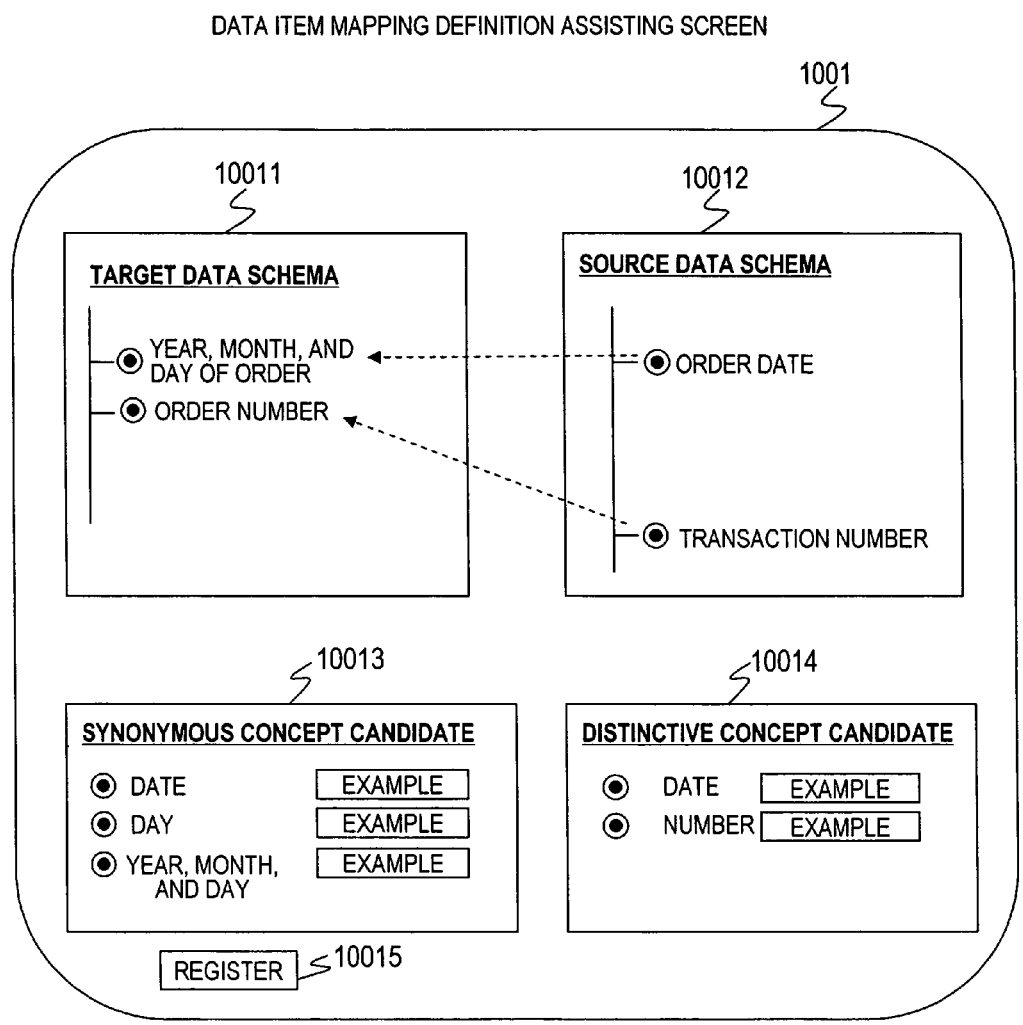
FIG. 10 is a diagram of a screen image showing a data item mapping definition assisting screen.

In FIG. 10, the data item mapping definition assisting screen 1001 includes a target schema display unit 10011 for displaying the data item name of the target data schema to be correlated, a source schema display unit 10012 for displaying the data item name of the source data schema which becomes a reference, a synonymous concept candidate display unit 10013 for displaying candidates of components of data item names which become synonymous between the two data schemas, a distinctive concept candidate display unit 10014 for displaying candidates of components of data item names set in a distinctive relation between the two data schemas, and a registration button 10015 for receiving operator's operation. The synonymous concept candidates and the distinctive concept candidates of the concepts included in the data item names are displayed in the synonymous concept candidate display unit 10013 and the distinctive concept candidate display unit 10014.

With respect to the data item names displayed in the source schema display unit 10012, candidates to be correlated (mapped) are displayed as mapping destination candidates in the target schema display unit 10011. When a user selects a proper candidate from the mapping destination candidates, and selects (clicks) the registration button 10015 by the input device 102, the selected mapping destination candidate is stored in the data schema mapping definition file 1071.

For example, in FIG. 10, when a data item name "order date" of the source data schema is displayed in the source schema display unit 10012 set in a display area of the screen right side, "year, month, and day of order" is displayed as a candidate to be correlated with "order date" in the target schema display unit 10011 set in the display area of the left side. The operator only needs to operate the registration button 10015 for approval regarding a narrowing-down result of the data item mapping definition assisting means 1087. In the synonymous concept candidate display unit 10013 of the lower left side of the screen 1001, a synonym to the date item name "year, month, and day of order" displayed in the target schema display unit 10011 is displayed. In the distinctive concept candidate display unit 10014 of the lower right side of the screen 1001, phrases which are set in a distinctive relation to be distinguished from each other are displayed from terms of the mapping destination candidates of the source and target schemas.

Similarly, when the user selects a proper candidate from the synonymous concept candidates and the distinctive concept candidates to click the registration button 10015, the pieces of information regarding the synonymous concept and the distinctive concept of the ontology 1061 are updated according to selected contents, and a value "1" indicating that the candidates have been checked is set in the checking flag 10546 shown in FIG. 5.

The example of approving the correlation (mapping) of the data item names of the two data schemas by operator's operation has been described. However, the mapping destination candidates narrowed down by the data item mapping definition assisting means 1087 may be automatically registered in the data schema mapping definition file 1071.

(Ontology Construction Assisting Means)

Figure 11:
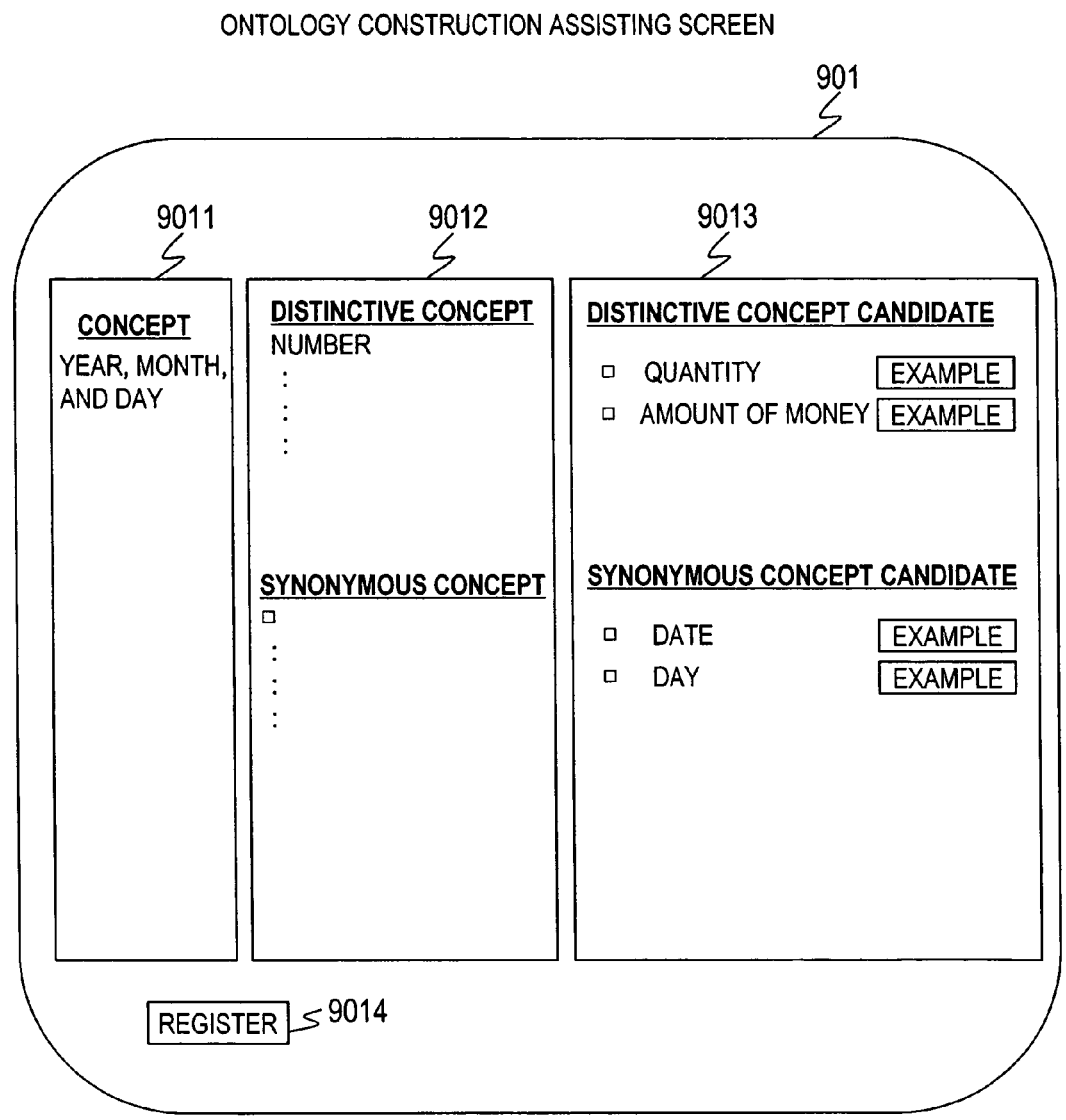
FIG. 11 is a diagram of a screen image showing an ontology construction assisting screen.

Finally, the ontology construction assisting means 1086 will be described. According to this embodiment, the ontology 1061 is partially constructed during the processing of the data item mapping definition assisting means 1087, and the ontology construction assisting means 1086 provides means for checking a distinctive concept and a synonymous concept for each concept. An example of an ontology construction assisting screen is shown in FIG. 11. The ontology construction assisting screen 901 includes a concept display unit 9011 for displaying a phrase corresponding to a selected concept, a concept relation display unit 9012 for displaying concepts which are set in distinctive and synonymous relations to the phrase displayed in the concept display unit 9011, a concept relation candidate display unit 9013 for displaying phrases which are set in distinctive and synonymous relations to the concepts displayed in the concept relation display unit 9012, and a registration button 9014 for receiving operator's operation. The concept relation display unit 9012 displays a synonymous concept, a distinctive concept, and a time order relation. The concept relation candidate display unit 9013 displays the synonymous concept candidates, the distinctive concept candidates, and the order relation candidates stored in the concept relation storage unit 1054. When the user selects proper candidates from the concept relation candidates to click the registration button 1094, the selected synonymous concept candidates, distinctive concept candidates, and order relation candidates are stored in the ontology 1061, and a value "1" indicating that the candidates have been checked is set in the checking flag 10616.

For the construction of the ontology 1061, distinctive and synonymous concept candidates of high priority may be automatically selected to be registered.

(Data Schema Mapping Definition File)

The data schema mapping definition file 1071 created by the data schema mapping definition assisting system enables integration of a database defined by the target data schema and the database defined by the source data schema.

For example, when retrieval is executed at "year, month, and day of order" in the database defined by the target data schema, a database system (not shown) refers to the data schema mapping definition file 1071, and to a data item name of the source data schema in which the data item name of the target data schema corresponds to "year, month, and day of order". A pointer of the data item name of the source data schema is obtained from the data schema mapping definition file 1071 shown in FIG. 12, and "order date" is obtained from the source data schema data item information storage unit 1051. Accordingly, the database system can virtually integrate the two databases to operate it by executing similar retrieval at "order date" in the database defined by the source data schema.

In the case of integrating the database defined by the source data schema with the database defined by the target data schema, data transfer only needs to be carried out between the data item names correlated with each other by the data schema mapping definition file 1071. For example, as shown in FIG. 10, data (instance) of the data item name "order date" of the database defined by the source data schema is written as data (instance) of the data item name "year, month, and day of order" of the database defined by the data name of the target data schema.

(Conclusion)

As described above, according to the first embodiment of this invention, the distinctive relation between the concepts is described in the ontology to narrow down correlation candidates of the data item names among a plurality of data schemas. To automate the ontology construction, the distinctive relation of concepts is extracted from the relations between the data item names of the data schemas. In other words, by using a nature that distinctive names are added to data items of the same master to be distinguished as different items", the distinctive relation between the concepts is extracted from the phrases of the data items of the same master. For example, when data item names of "request number" and "request date" are in sibling relation to each other, knowledge that ""request number" and "request date" are distinctive concepts (concepts to be distinguished from each other)" is extracted. Additionally, knowledge that ""number" and "date" indicating a difference between "request number" and "request date" are distinctive concepts (concepts to be distinguished from each other)" is extracted.

According to the first embodiment of this invention, the time order relation is described in the ontology to narrow down the correlation candidates of the data item names. To automate the ontology construction, the time order relation is extracted from the instance document. For example, in the instance document, as "shipping date" is always ahead of "arrival date", the time order relation that ""shipping" is ahead of "arrival"" is extracted.

As described above, according to the first embodiment of this invention, by using the ontology describing the distinctive and time order relations between the concepts to correlate the data item names among the plurality of data schemas, it is possible to accurately and easily narrow down the correlation candidates of the data item names. Especially, the correlation of the data item name that has been manually carried out as in the case of the conventional example can be automated. Thus, it is possible to quickly deal with changes such as integration (virtual or physical integration) of different databases, introduction of a new database, updating of a database, and upgrade of the database compliant with the industry standard.

The program that executes the above-mentioned processing can be stored in the medium that can be read with the computer. The machine-readable medium comprises the storage system and the like.

Second Embodiment (Information Retrieval System Using Distinctive Relation)

The first embodiment has been described by way of the method of extracting the concept relation "distinctive relation" from the data schema to be used for correlating the data item names between the data schemas. As "distinctive relation" is useful when the correlations of the date item names of the two data schemas are narrowed down, it can be applied to conversion of retrieval conditions for retrieving proper information from a plurality of information servers. In the information retrieval, a method called question extension is known as means for reducing retrieval leakage.

The question extension means automatic addition of words associated with a word of a retrieval question to the retrieval question. For example, when the retrieval question is "automobile", "car", "passenger car", "private car", or the like is added. A word to be added in the question extension is a different representation (computer→computer), a synonym (computer→calculator), a superordinate word (personal computer→computer), a subordinate word (computer→personal computer), or the like.

As a method of finding a word to be added, a method of creating a dictionary or a thesaurus in advance is generally employed. For example, JP 2003-345821 A discloses the method of conversion into proximate retrieval conditions by using the ontology. When the retrieval conditions are extended by the criterion "similarity", retrieval leakage is reduced, but noise is easily generated. Thus, according to the second embodiment, by using knowledge of "distinctive relation" to narrow down candidates, it is possible to convert the candidates into more proper retrieval conditions. For example, noise can be reduced by not only adding an upper word such as "passenger car" or "car" to a retrieval question of "private car" but also using knowledge that "private" and "commercial" are in distinctive relation to eliminate "commercial car".

Figure 13:
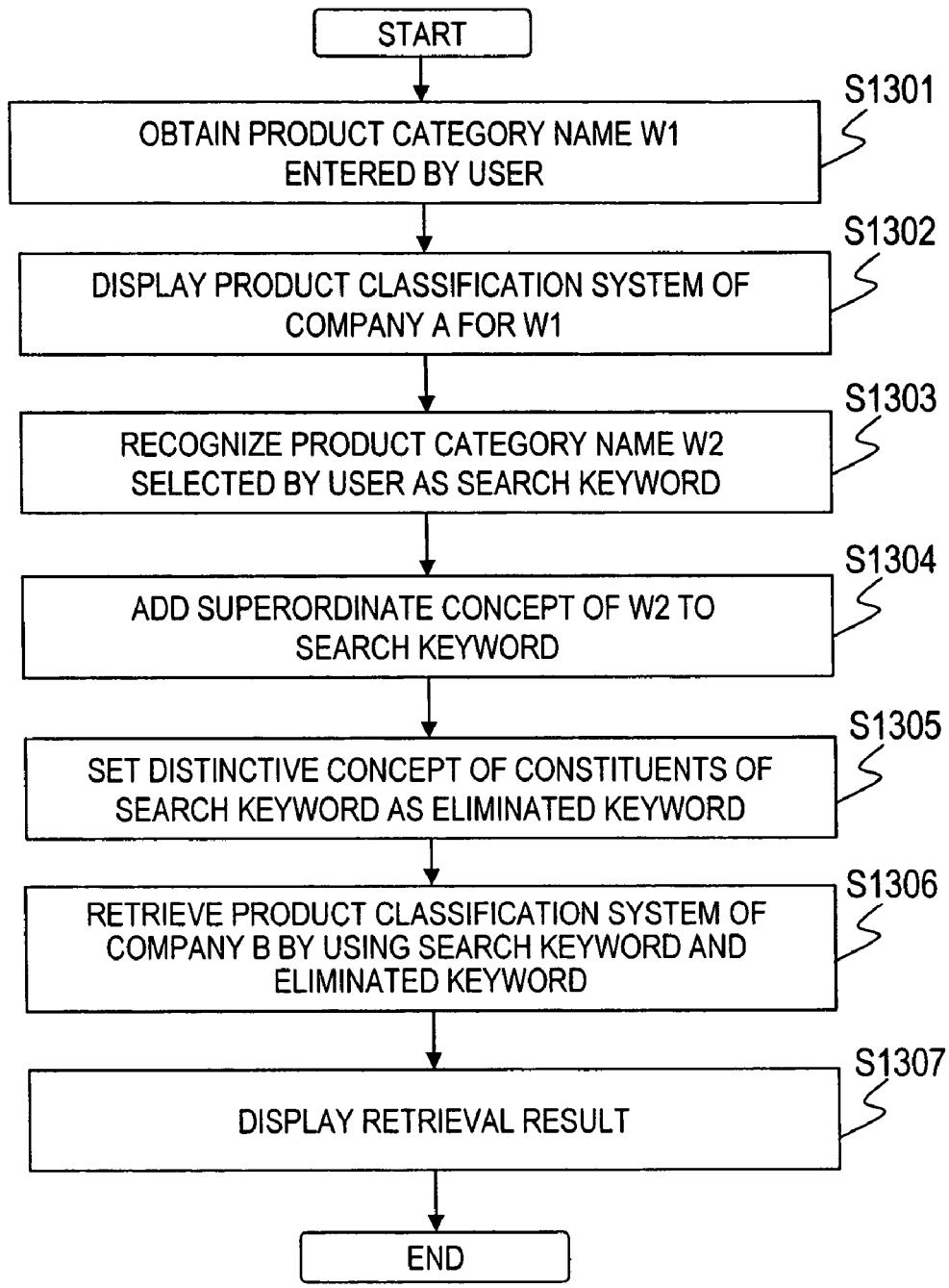
FIG. 13 is a flowchart of processing showing an example of an information retrieval system.
Figure 14A:
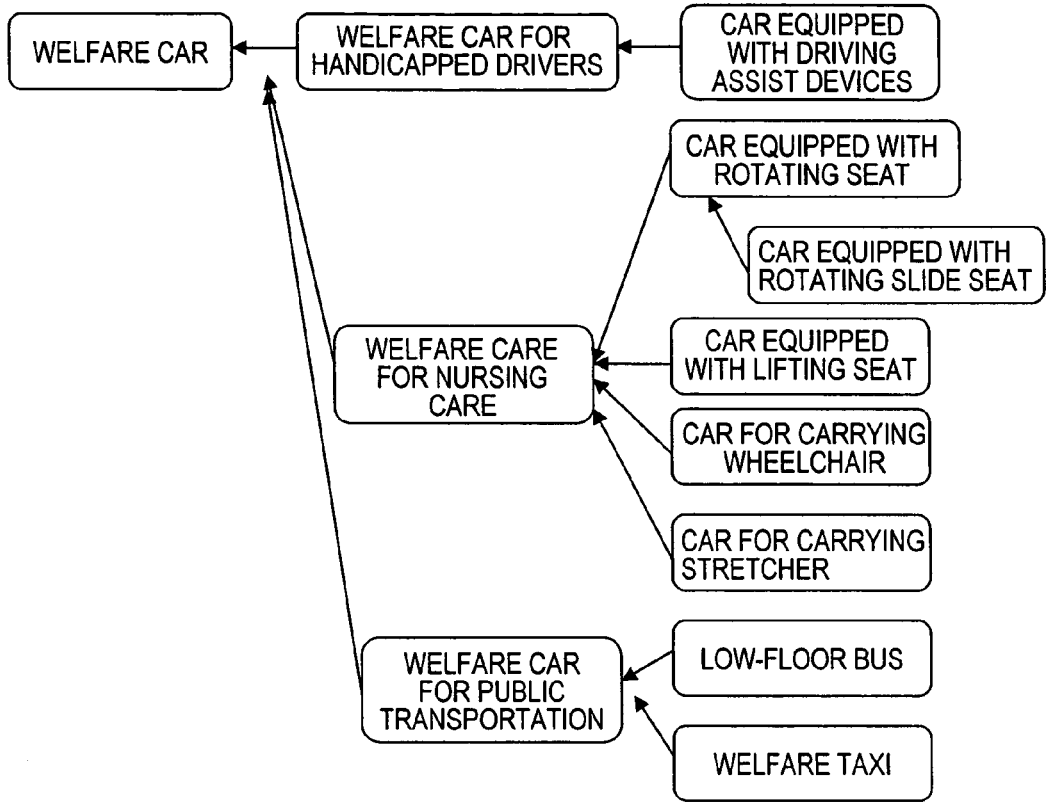
FIGS. 14A and 14B are explanatory diagrams of examples of a hierarchical relation and a distinctive relation of words, where

Referring to a flowchart of FIG. 13, a retrieval procedure of an information retrieval system using pieces of information regarding hierarchical and distinctive relations described in an ontology will be described. Processing of the flowchart of FIG. 13 is carried out by the same computer as that of FIG. 1. This retrieval system is a system for referring to product systems of a plurality of companies to retrieve information of a product desired by a user. It is presumed that the system holds a dictionary for recording a concept relation between words and a dictionary for recording a distinctive relation between words of the invention. First, when the user enters "welfare car" as a product category name to be searched (S1301), the system displays an example of a product parts system of "welfare car" as reference information, e.g., company A's product classification system shown in FIG. 14A on a screen (S1302). A form of displaying is not limited to those of FIGS. 14A and 14B, but a word associated with an input word may be explicitly displayed. When the user selects "car equipped with a lifting seat" as a product classification name, the system recognizes "car equipped with a lifting seat" as a search keyword (S1303). Further, superordinate concepts of "car equipped with a lifting seat", i.e., "welfare car for nursing care" and "welfare car" are added to the search keywords (S1304).

Figure 14B:
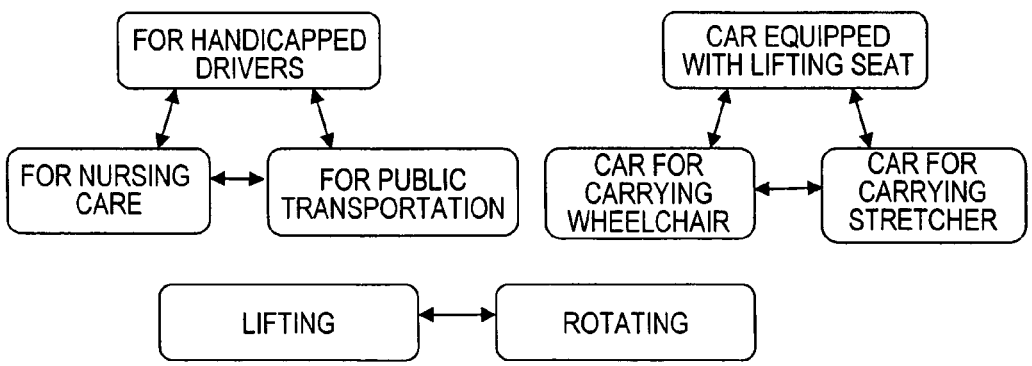
Figure 15A:
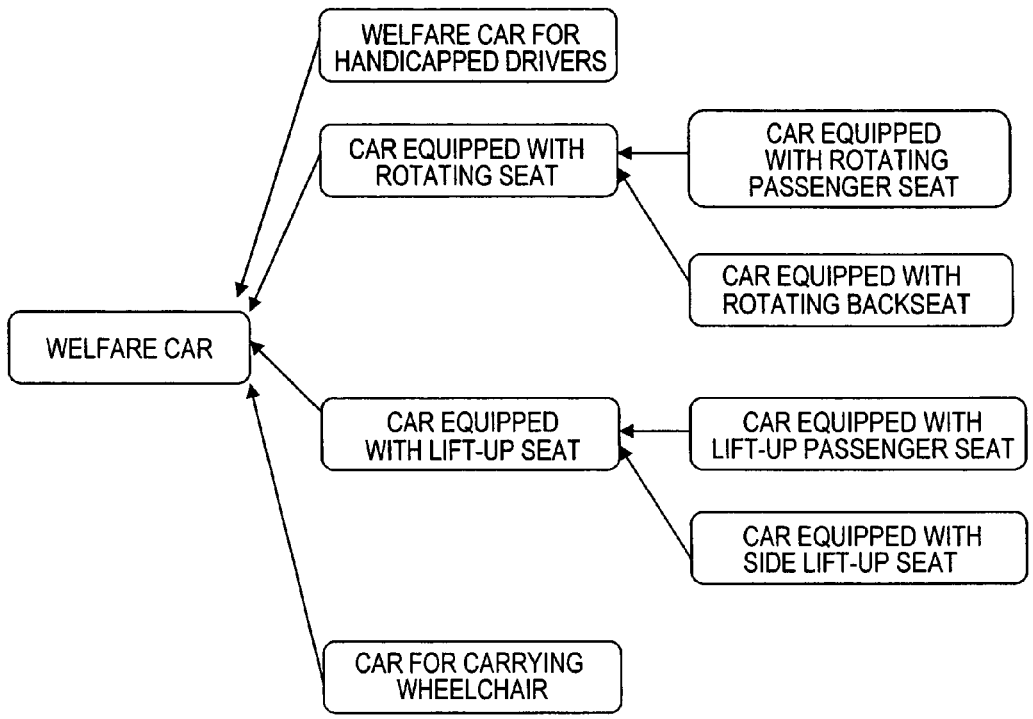
FIGS. 15A and 15B are explanatory diagrams of other examples of a hierarchical relation and a distinctive relation between words, where
Figure 15B:
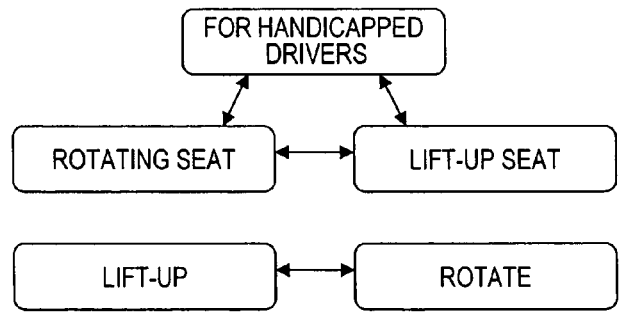

Next, information regarding a distinctive relation shown in FIG. 14B is referred to in order to set a distinctive concept of a word constituting the search keyword as an elimination keyword (S1305). For example, distinctive concepts "car for carrying a wheelchair" and "car for carrying a stretcher" of "car equipped with a lifting seat", a distinctive concept "rotate" of "lift", a distinctive concept "for handicapped drivers" of "for nursing care", and "for public transportation" are set as elimination keywords. After the extension of the search keywords and the setting of the elimination keywords, information of products corresponding to "car equipped with a lifting seat" is retrieved by targeting product systems of a plurality of companies (S1306). For example, "what is classified as "car equipped with a lifting seat", "welfare car for nursing care" or "welfare car" and includes none of "car for carrying a wheelchair", "car for carrying a stretcher", "rotate", "for handicapped drivers", and "for public transportation"" is retrieved. According to this method, as shown in FIGS. 15a and 15b, even when there is no production classification name of "car equipped with a lifting seat" in a company B, "welfare car for handicapped drivers", "car equipped with a rotating seat", and "car for carrying a wheelchair" among "welfare car" are eliminated, and only "car equipped with a lift-up passenger seat" is displayed as a retrieval result (S1307). Unless the distinctive relation of this invention is used, the search keyword can be extended to "welfare car" which is a superordinate concept. However, "car for handicapped drivers", "car equipped with a rotating seat", and "car for carrying a wheelchair" cannot be eliminated from the candidates.

Thus, according to the second embodiment of this invention, by narrowing down the retrieval conditions based on the knowledge of the distinctive relation, it is possible to convert the conditions into more proper retrieval conditions, and to obtain a retrieval result of less noise while preventing retrieval leakage.

This invention can be applied to integration of different databases, and especially to virtual integration of databases to newly realize information association or service association of the database in a new company or between companies. Furthermore, this invention can be applied to an information retrieval system or the like for judging a concept of a word or a phrase.

While the present invention has been described in detail and pictorially in the accompanying drawings, the present invention is not limited to such detail but covers various obvious modifications and equivalent arrangements, which fall within the purview of the appended claims.

What is claimed is:

1. A program stored on a computer-readable medium, which refers to a first data schema and a second data schema that describe data structures to correlate a data item name constituting the first data schema with a data item name constituting the second data schema, the program being implemented on and controlling a computer to execute the procedures of:

extracting the data item name constituting the first data schema;

extracting the data item name constituting the second data schema;

extracting element concepts included in the extracted data item names of the first data schema and the second data schema;

setting a distinctive relation and a time-sequential order relation between the data item names based on the extracted element concepts;

reading the data item names of the first data schema and the second data schema and setting a correlation between the two read data item names based on the distinctive relation to satisfy a constraint imposed by the time-sequential order relation between the data item names; and accumulating the correlation of the data item names;

reading two data item names of one of the first data schema and the second data schema;

extracting a set of common character strings from among character strings constituting the two data item names as a first element concept when character strings of the two data item names are compared with each other and are judged to include synonymous character strings; and extracting a set of character strings excluding common character strings from the character strings constituting the two data item names as a second element concept when the character strings of the two data item names are compared with each other and are judged to include synonymous character strings;

judging a time-sequential order relation for the two item names corresponding to the second element concept; and setting that the set of character strings constituting the second element concept has a distinctive relation when no time-sequential order relation is included in the second element concept.

2. The program according to claim 1, wherein the correlation procedure sets that the two data items correspond to each other when the character strings of the two read data item names are compared with each other and are judged to include the synonymous character stings but not to have a distinctive relation.

3. A program stored on a computer-readable medium, which refers to a first data schema and a second data schema that describe data structures to generate a distinctive relation between a data item name constituting the first data schema and a data item name constituting the second data schema, the program being implemented on and controlling a computer to execute the procedures of:

extracting the data item name constituting the first data schema;

extracting the data item name constituting the second data schema;

reading two data item names of one of the first data schema and the second data schema;

extracting a set of character strings excluding common character strings from the character strings constituting the two data item names as a second element concept when the character strings of the two data item names are compared with each other and are judged to include synonymous character strings;

judging a time-sequential order relation for the two data item names corresponding to the second element concept; and setting that the set of character strings constituting the second element concept has a distinctive relation when no time-sequential order relation is included in the second element concept; and determining an order of data item names according to a time-sequential order of values of the data item names;

wherein the procedure of setting the distinctive relation includes the procedure of storing in an ontology the set of character strings and a value indicating that a concept relation between the set of character strings is a distinctive relation;

extracting a set of common character strings from among character strings constituting the two data item names as a first element concept when the character strings of the two data item names are compared with each other and are judged to include synonymous character stings; and storing in the ontology the set of character strings and the value indicating that the concept relation between the set of character stings is a synonymous relation.

4. A computer system, comprising:

a first data schema storage unit for storing an input first data schema;

a second data schema storage unit for storing an input second data schema;

a data item name fetching unit for extracting the data item name constituting the first data schema stored in the first data schema storage unit to store the same in a first data item name storage unit, and extracting the data item name constituting the second data schema stored in the second data schema storage unit to store the same in a second data item name storage unit;

a concept extraction unit for extracting element concepts included in the data item names of the first data item name storage unit and the second data item name storage unit;

a distinctive relation extraction unit for extracting a distinctive relation between the data item names from the extracted element concepts to store the same in an ontology;

a time-sequential order relation extracting unit for extracting a time-sequential order relation between the data item names from the extracted element concepts for storing in the ontology a synonymous relation extraction unit for extracting a synonymous relation between the data item names from the extracted element concepts to store the same in the ontology; and a mapping definition unit for reading data item names from the first data item name-storage unit and the second data item name storage unit, judging correspondence between the two read data item names based on the distinctive relation and the synonymous relation stored in the ontology to satisfy a constraint imposed by the time-sequential order relation stored in the ontology, and storing the correspondence in a mapping filet;

a comparison unit for reading two data item names from one of the first data item name storage unit and the second data item name storage unit to compare character strings of the two data item names with each other; and an element concept extraction unit for extracting a set of common character strings from among the character strings constituting the two data item names as a first element concept when the two data item names include Synonymous character strings, and extracting a set of character strings excluding common character strings from the character strings constituting the two data item names as a second element concept when the two data item names include the synonymous character strings;

a procedure order relation extraction unit for extracting a time-sequential relation for the two item names corresponding to the second element concept; and a distinctive relation judgment unit for judging that the set of character strings constituting the second element concept has a distinctive relation when no time-sequential order relation is included in the second element concept.

* * * * *